(12) United States Patent
Chiproot

(10) Patent No.: US 9,890,884 B1
(45) Date of Patent: Feb. 13, 2018

(54) CLAMPING RING WITH IMPROVED CONNECTING STRUCTURE

(71) Applicant: Eliezer Krausz Industrial Development Ltd., Tel Aviv (IL)

(72) Inventor: Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 0 days.

(21) Appl. No.: 15/663,767

(22) Filed: Jul. 30, 2017

(51) Int. Cl.
    *F16L 21/06* (2006.01)
    *F16B 2/10* (2006.01)

(52) U.S. Cl.
    CPC ............... *F16L 21/06* (2013.01); *F16B 2/10* (2013.01)

(58) Field of Classification Search
    CPC .................................. F16L 21/06; F16B 2/10
    See application file for complete search history.

(56) References Cited

U.S. PATENT DOCUMENTS

| | | | | |
|---|---|---|---|---|
| 1,596,944 A * | 8/1926 | Philbrook | ............... | F16L 33/04 138/99 |
| 3,964,773 A * | 6/1976 | Stade | .................. | F01N 13/1805 285/367 |
| 4,373,235 A * | 2/1983 | Korgaonkar | ............ | F16L 23/04 24/282 |
| D283,486 S * | 4/1986 | Fogel | .............................. | D8/396 |
| D283,675 S * | 5/1986 | Fogel | .............................. | D8/396 |
| 4,915,418 A * | 4/1990 | Palatchy | .................. | F16L 17/04 24/284 |
| 4,940,261 A * | 7/1990 | Somers Vine | .......... | F16L 17/04 285/112 |
| 5,018,768 A * | 5/1991 | Palatchy | .................. | F16L 17/04 24/284 |
| 6,464,268 B1 * | 10/2002 | Hough | .................... | F16L 23/08 285/367 |
| 8,448,993 B2 * | 5/2013 | Cumic | .................. | F16L 21/022 285/112 |
| 2002/0109355 A1 * | 8/2002 | Elliott | ....................... | F16B 2/10 285/410 |
| 2013/0076020 A1 * | 3/2013 | Lucey | .................... | F16L 19/065 285/123.12 |

* cited by examiner

*Primary Examiner* — Robert Sandy
*Assistant Examiner* — David M Upchurch
(74) *Attorney, Agent, or Firm* — Dekel Patent Ltd.; David Klein

(57) ABSTRACT

A clamping ring includes first and second clamping ring members, each of which includes: a) an inner curved contour with a circumferential span of at least 90° that extends from a lower face to an upper face, the upper face being formed with an aperture for receiving therein a fastener for tightening the first and second clamping ring members towards each other, and b) an inner groove for receiving therein a seal. The first clamping ring member includes a first connecting member that extends circumferentially beyond the lower face. The second clamping ring member includes a second connecting member that couples the first connecting member with the second clamping ring member.

11 Claims, 3 Drawing Sheets

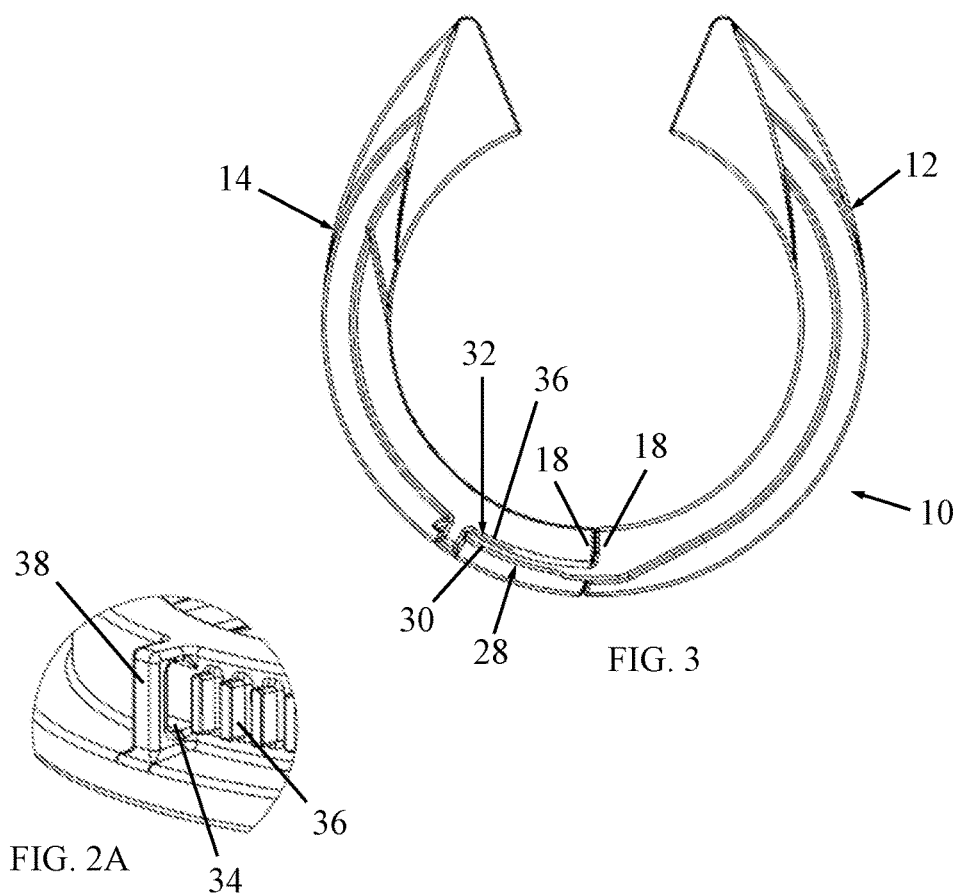
FIG. 3
FIG. 2A
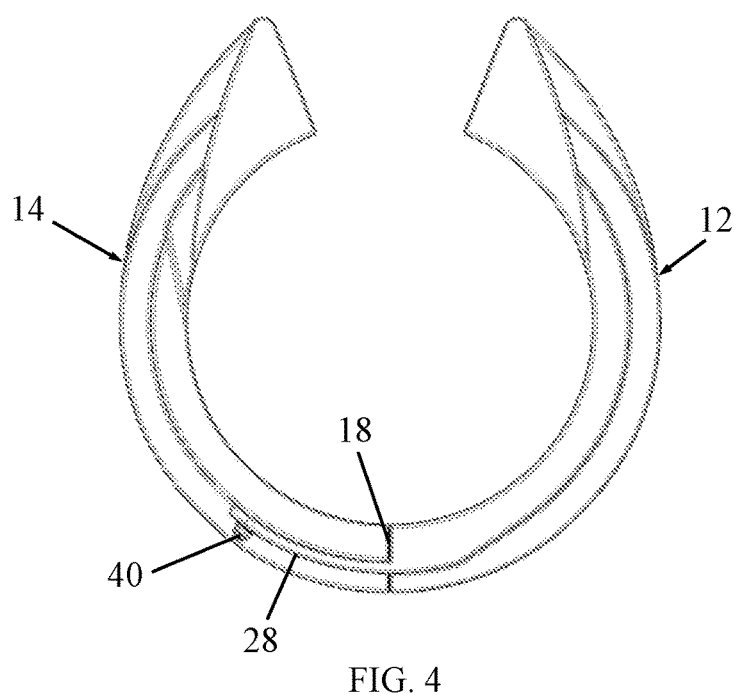
FIG. 4

US 9,890,884 B1

CLAMPING RING WITH IMPROVED CONNECTING STRUCTURE

FIELD OF THE INVENTION

The present invention relates generally to pipe couplings and clamping rings, and particularly to a split clamping ring with better strength connecting structure between the two halves of the ring.

BACKGROUND OF THE INVENTION

Many kinds of pipe couplings with clamping rings exist in the art. It is noted that throughout the specification and claims, the term "pipe" encompasses any kind of generally cylindrical object. For example, one large family of pipe couplings includes a cylindrical housing with a clamping ring at one end or both ends of the housing. The clamping ring has a seal in its inner contour. Tightening the clamping ring tightens the seal on the outer contour of a pipe.

One kind of clamping ring is a unitary ring, which may be made of cast iron or other suitable material. The ring is not a full ring but a partial ring with open upper ends that are tightened towards each other with bolts or other fasteners.

Another kind of clamping ring is a split clamping ring; the ring has two halves that are hinged together at the bottom of the ring opposite the open ends that are tightened together.

However, as opposed to continuous rings in which the forces on the ring are somewhat uniformly distributed, in split clamping rings the forces are different at the clamp ends and at the hinge ends and therebetween. The result is the forces may tend to cause the complete ring to depart from a true circular shape, and the seal or gasket may not seal properly around the entire circumference of the pipe. The hinge must bear higher forces, which makes the hinges generally heavier and thicker.

SUMMARY OF THE INVENTION

The present invention seeks to provide a split clamping ring with connecting structure between the two halves of the ring that has improved strength over hinges, as is described more in detail hereinbelow.

There is thus provided in accordance with an embodiment of the present invention a clamping ring including first and second clamping ring members, each of which includes: a) an inner curved contour with a circumferential span of at least 90° that extends from a lower face to an upper face, the upper face being formed with an aperture for receiving therein a fastener for tightening the first and second clamping ring members towards each other, and b) an inner groove for receiving therein a seal. The first clamping ring member includes a first connecting member that extends circumferentially beyond the lower face. The second clamping ring member includes a second connecting member that couples the first connecting member with the second clamping ring member.

In accordance with an embodiment of the present invention the second connecting member couples the first connecting member to an outer periphery of the second clamping ring member.

In accordance with an embodiment of the present invention the first connecting member includes a first male/female connector on a circumferential surface thereof, and wherein the second connecting member is formed with an opening through which the first connecting member is received and includes a second male/female connector on a circumferential surface thereof, wherein the first and second male/female connectors engage each other when the first and second clamping ring members are tightened towards each other.

In accordance with an embodiment of the present invention the first male/female connector is formed on an inner circumferential surface of the first connecting member and the second male/female connector is formed on an outer circumferential surface of the second connecting member.

In accordance with an embodiment of the present invention the opening through which the first connecting member is received is formed on a lug that protrudes outwards from the second clamping ring member.

In accordance with an embodiment of the present invention the first connecting member includes a stop that limits circumferential travel of the first connecting member through the opening.

In accordance with an embodiment of the present invention the first and second male/female connectors include teeth circumferentially spaced from one another.

In accordance with an embodiment of the present invention the second connecting member includes a mechanical fastener which couples an end portion of the first connecting member to an outer periphery of the second clamping ring member.

In accordance with an embodiment of the present invention the first connecting member is coupled to the first clamping ring member with a mechanical fastener.

In accordance with an embodiment of the present invention the first connecting member is coupled to the first clamping ring member by being received in a lug formed with an opening through which the first connecting member is received.

In accordance with an embodiment of the present invention the lower faces of the first and second clamping ring members have flat portions that abut against each other when the first and second clamping ring members are tightened towards each other.

In accordance with an embodiment of the present invention one of the lower faces of the first and second clamping ring members has a rounded portion that does not abut against the other of the lower faces of the first and second clamping ring members when the first and second clamping ring members are tightened towards each other.

In accordance with an embodiment of the present invention a fastener is received in the apertures of the upper faces and a seal is disposed in the inner grooves.

BRIEF DESCRIPTION OF THE DRAWINGS

The present invention will be understood and appreciated more fully from the following detailed description, taken in conjunction with the drawing in which:

FIG. 2A is an enlarged illustration of a portion of the connecting structure;

FIG. 3 is a simplified end-view of the split clamping ring; and

FIGS. 4, 5 and 6 are simplified pictorial illustrations of split clamping rings, constructed and operative in accordance with other non-limiting embodiments of the present invention.

DETAILED DESCRIPTION OF EMBODIMENTS

Figure 1:
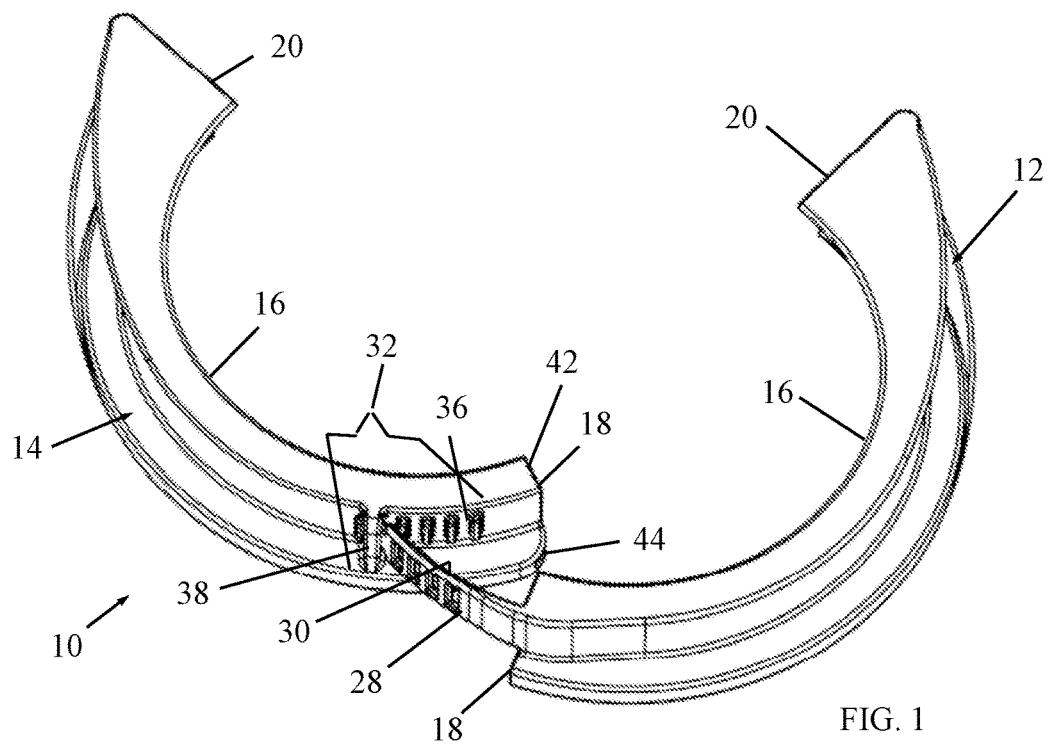
FIGS. 1 and 2 are simplified pictorial illustrations of a split clamping ring, constructed and operative in accordance with a non-limiting embodiment of the present invention, including two ring halves connected by connecting structure, respectively with the connecting structure open and closed.
Figure 2:
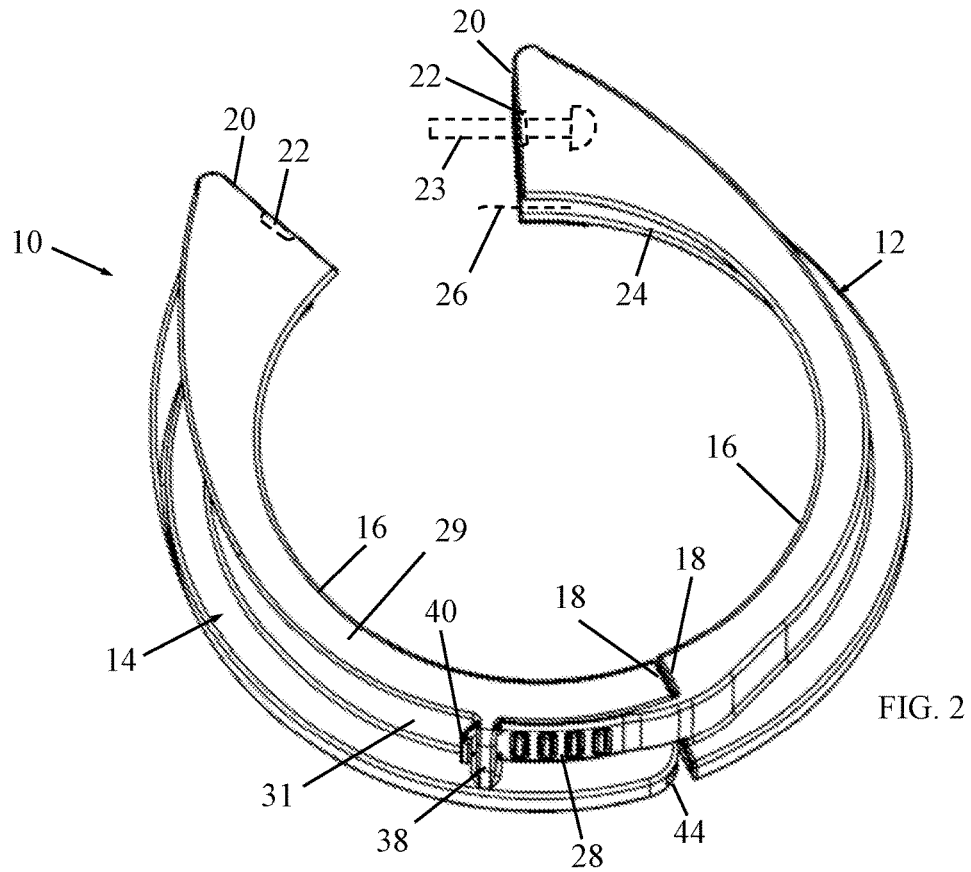

Reference is now made to FIGS. 1-3, which illustrate a clamping ring 10, constructed and operative in accordance with a non-limiting embodiment of the present invention.

The clamping ring 10 includes first and second clamping ring members 12 and 14. Each clamping ring member 12 or 14 includes an inner curved contour 16 with a circumferential span of at least 90° that extends from a lower face 18 to an upper face 20. The upper face 20 is formed with an aperture 22 for receiving therein a fastener 23 (shown in broken lines in FIG. 2) for tightening the first and second clamping ring members 12 and 14 towards each other.

Each clamping ring member 12 or 14 includes an inner groove 24 for receiving therein a seal 26 (shown in broken lines in FIG. 2).

The first clamping ring member 12 includes a first connecting member 28 that extends circumferentially beyond the lower face 18 and which includes a first male/female connector 30 on a circumferential surface thereof. The second clamping ring member 14 includes a second connecting member 32 for coupling the first connecting member 28 with the second clamping ring member 14. In the embodiment of FIG. 1, the second connecting member 32 includes a lug 38 formed with an opening 34 (seen best in FIG. 2A) through which the first connecting member 28 is received, and further includes a second male/female connector 36 on a circumferential surface thereof. Opening 34 may be oblong or formed as a slit to accommodate a flat, tongue-like shape of first connecting member 28. Lug 38 protrudes outwards from the second clamping ring member 14.

It is noted that the second connecting member 32 couples the first connecting member 28 to an outer periphery 31 (FIG. 2) of the second clamping ring member 14. Alternatively, the second connecting member 32 could couple the first connecting member 28 to a face 29 (FIG. 2) of the second clamping ring member 14, which is inwards of and perpendicular to the outer periphery 31.

As seen in FIGS. 2 and 3, the first and second male/female connectors 30 and 36 engage each other when the first and second clamping ring members 12 and 14 are tightened towards each other. In one non-limiting embodiment, the first male/female connector 30 is formed on an inner circumferential surface of the first connecting member 28 and the second male/female connector 36 is formed on an outer circumferential surface of the second connecting member 32. For example, the first and second male/female connectors may include teeth circumferentially spaced from one another, such as ratchet teeth, grooves and tenons, serrations, and the like.

In one non-limiting embodiment, the first connecting member 28 includes a stop 40 (such as a bent end, tab, knob and the like) that limits circumferential travel of the first connecting member 28 through the opening 34.

In one non-limiting embodiment, the lower faces 18 of the first and second clamping ring members 12 and 14 have flat portions 42 (FIG. 1) that abut against each other when the first and second clamping ring members 12 and 14 are tightened towards each other.

In one non-limiting embodiment, one of the lower faces 18 of the first and second clamping ring members 12 or 14 has a rounded portion 44 that does not abut against the other of the lower faces of the first and second clamping ring members when the first and second clamping ring members 12 and 14 are tightened towards each other (as seen in FIG. 2). The rounded portion 44 may allow for relative movement between the first and second clamping ring members 12 and 14 when they are tightened towards each other.

Figure 5:
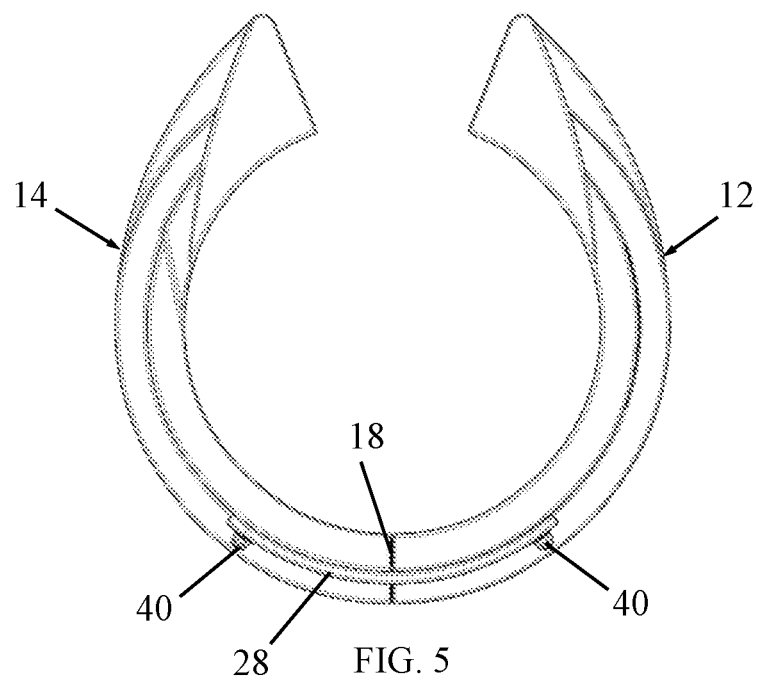
Figure 6:
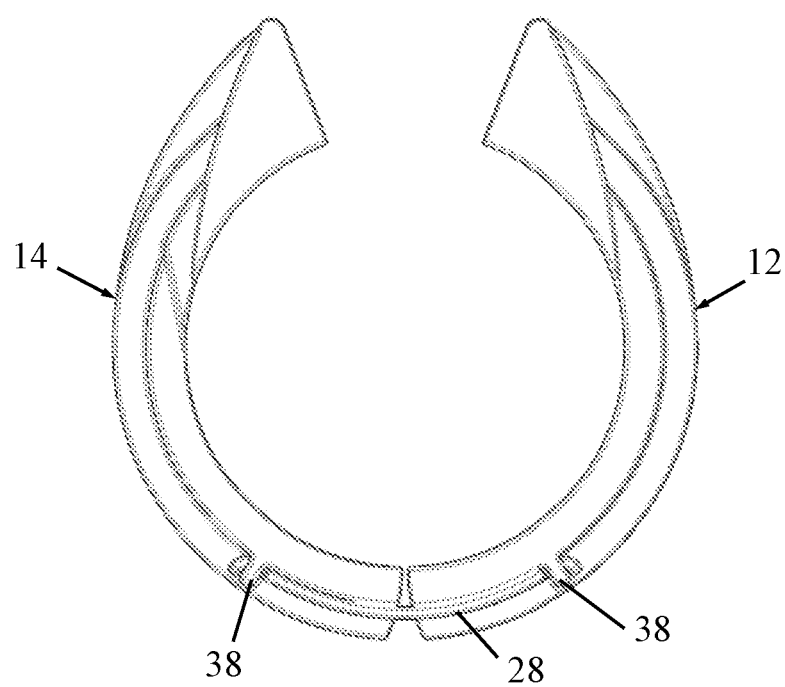

Reference is now made to FIGS. 4, 5 and 6, which illustrate split clamping rings, constructed and operative in accordance with other non-limiting embodiments of the present invention. In all of the embodiments of FIGS. 1-6, the first clamping ring member 12 includes a first connecting member 28, which extends circumferentially beyond the lower face 18 and which includes a first male/female connector 30 on a circumferential surface thereof. The second clamping ring member 14 includes a second connecting member 32 for coupling the first connecting member 28 with the second clamping ring member 14. The difference between the embodiments is the type of second connecting member 32 and how it couples the first connecting member 28 with the second clamping ring member 14.

In FIG. 4, the second connecting member is a mechanical fastener 40, such as but not limited to, a screw, rivet or others, which couples an end portion (the far end) of first connecting member 28 to the outer periphery of the second clamping ring member 14.

The embodiment of FIG. 5 is similar to the embodiment of FIG. 4. Here, too, the first connecting member 28 extends circumferentially beyond the lower face 18 of the first clamping ring member 12, but instead of being an integral part of the first clamping ring member 12, the first connecting member 28 is coupled to the first clamping ring member 12 with another mechanical fastener 40, such as but not limited to, a screw, rivet or others, just as the other end is coupled with fastener 40 to the second clamping ring member 14.

The embodiment of FIG. 6 is similar to the embodiment of FIG. 1. Here, too, the first connecting member 28 extends circumferentially beyond the lower face 18 of the first clamping ring member 12, but instead of being an integral part of the first clamping ring member 12, the first connecting member 28 is coupled to the first clamping ring member 12 by being received in another lug 38 just as the other end is coupled to the second clamping ring member 14, as described above with reference to FIG. 1.

What is claimed is:
1. A clamping ring comprising:
   first and second clamping ring members, each of which comprises: a) an inner curved contour that extends from a lower face to an upper face, said upper face being formed with an aperture for receiving therein a fastener for tightening said first and second clamping ring members towards each other, and b) an inner groove for receiving therein a seal;
   said first clamping ring member comprising a first connecting member that extends circumferentially beyond said lower face; and
   wherein said second clamping ring member comprises a second connecting member that couples said first connecting member with said second clamping ring member; and
   wherein said first connecting member comprises a first male/female connector on a circumferential surface thereof, and wherein said second connecting member is formed with an opening through which said first connecting member is received and comprises a second male/female connector on a circumferential surface thereof, wherein said first and second male/female connectors engage each other when said first and second clamping ring members are tightened towards each other; and wherein said opening through which said first connecting member is received is formed on a lug that protrudes outwards from said second clamping ring member.

2. The clamping ring according to claim 1, wherein said second connecting member couples said first connecting member to an outer periphery of said second clamping ring member.

3. The clamping ring according to claim 1, wherein said first male/female connector is formed on an inner circumferential surface of said first connecting member and said second male/female connector is formed on an outer circumferential surface of said second connecting member.

4. The clamping ring according to claim 1, wherein said first connecting member comprises a stop that limits circumferential travel of said first connecting member through said opening.

5. The clamping ring according to claim 1, wherein said first and second male/female connectors comprise teeth circumferentially spaced from one another.

6. The clamping ring according to claim 1, wherein said second connecting member comprises a mechanical fastener which couples an end portion of said first connecting member to an outer periphery of said second clamping ring member.

7. A clamping ring comprising:
   first and second clamping ring members, each of which comprises: a) an inner curved contour that extends from a lower face to an upper face, said upper face being formed with an aperture for receiving therein a fastener for tightening said first and second clamping ring members towards each other, and b) an inner groove for receiving therein a seal;
   said first clamping ring member comprising a first connecting member that extends circumferentially beyond said lower face; and
wherein said second clamping ring member comprises a second connecting member that couples said first connecting member with said second clamping ring member, and wherein said first connecting member is coupled to said first clamping ring member with a mechanical fastener.

8. A clamping ring comprising:
   first and second clamping ring members, each of which comprises: a) an inner curved contour that extends from a lower face to an upper face, said upper face being formed with an aperture for receiving therein a fastener for tightening said first and second clamping ring members towards each other, and b) an inner groove for receiving therein a seal;
   said first clamping ring member comprising a first connecting member that extends circumferentially beyond said lower face; and
wherein said second clamping ring member comprises a second connecting member that couples said first connecting member with said second clamping ring member, and wherein said first connecting member is coupled to said first clamping ring member by being received in a lug formed with an opening through which said first connecting member is received.

9. The clamping ring according to claim 1, wherein said lower faces of said first and second clamping ring members have flat portions that abut against each other when said first and second clamping ring members are tightened towards each other.

10. The clamping ring according to claim 1, wherein one of said lower faces of said first and second clamping ring members has a rounded portion that does not abut against the other of said lower faces of said first and second clamping ring members when said first and second clamping ring members are tightened towards each other.

11. The clamping ring according to claim 1, further comprising a fastener received in the apertures of said upper faces and a seal disposed in said inner grooves.

* * * * *